United States Patent
Lee

(10) Patent No.: US 7,567,314 B2
(45) Date of Patent: *Jul. 28, 2009

(54) FLAT PANEL DISPLAY APPARATUS HAVING FIXING MEMBER TO SECURE DISPLAY MODULE

(75) Inventor: Ick-Hwan Lee, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 11/264,603

(22) Filed: Nov. 1, 2005

(65) Prior Publication Data

US 2006/0050196 A1  Mar. 9, 2006

Related U.S. Application Data

(62) Division of application No. 10/631,453, filed on Jul. 30, 2003, now Pat. No. 7,006,168.

(30) Foreign Application Priority Data

Sep. 3, 2002  (KR) .................. 10-2002-0052653

(51) Int. Cl.
*G02F 1/1333* (2006.01)
(52) U.S. Cl. .......................... 349/58; 349/60
(58) Field of Classification Search .............. 349/58–60
See application file for complete search history.

(56) References Cited

U.S. PATENT DOCUMENTS

| | | | | |
|---|---|---|---|---|
| 5,729,310 A * | 3/1998 | Horiuchi et al. | ............... | 349/62 |
| 5,946,061 A * | 8/1999 | Kurihara et al. | ............... | 349/58 |
| 6,411,353 B1 * | 6/2002 | Yarita et al. | .................... | 349/59 |
| 6,411,501 B1 * | 6/2002 | Cho et al. | .................... | 361/681 |
| 6,542,206 B1 * | 4/2003 | Saito | ............................ | 349/58 |
| 6,593,979 B1 * | 7/2003 | Ha et al. | ........................ | 349/58 |
| 6,654,078 B1 * | 11/2003 | Kato et al. | ..................... | 349/58 |
| 6,671,012 B1 * | 12/2003 | Tanaka | ......................... | 349/58 |
| 6,741,299 B2 * | 5/2004 | Fukayama et al. | ............ | 349/58 |
| 7,006,168 B2 * | 2/2006 | Lee | ............................... | 349/58 |
| 2002/0171784 A1 * | 11/2002 | Choi et al. | ..................... | 349/58 |
| 2005/0062901 A1 * | 3/2005 | Inoue | ........................... | 349/58 |

FOREIGN PATENT DOCUMENTS

JP  2000077867 A  3/2000

(Continued)

OTHER PUBLICATIONS

Machine translation of JP 2002-182209, made of record by the applicant.*

(Continued)

*Primary Examiner*—Andrew Schechter

(57) ABSTRACT

Disclosed is a flat panel display apparatus having fixing members each disposed between a display module and a case to combine the display module to the case. The fixing members prevent the display module from being moved in Z- and Y-directions using a body portion and a first guide portion facing each other and second guiding portions extended from the end portions of the body portion, respectively. Also, the fixing members prevent the display module from being moved in X-direction using a connecting portion that connects the body portion and the first guide portion.

5 Claims, 14 Drawing Sheets

FOREIGN PATENT DOCUMENTS

| | | |
|---|---|---|
| JP | 2002156621 | 5/2002 |
| JP | 2002-182209 | 6/2002 |
| KP | 1020000058094 A | 9/2000 |
| KR | 1020020050815 A | 6/2002 |
| TW | 1263090 | 10/2006 |

OTHER PUBLICATIONS

Chinese Office Action and English translation; date: Jan. 9, 2007; Application No. 03155688.4. All references cited in the office action are listed above.

Taiwan Office Action and English translation; date: May 17, 2007; Application No. 92120796.

* cited by examiner

FLAT PANEL DISPLAY APPARATUS HAVING FIXING MEMBER TO SECURE DISPLAY MODULE

CROSS REFERENCE TO RELATED APPLICATIONS

This application is a divisional application of U.S. patent application Ser. No. 10/631,453, filed on Jul. 30, 2003 now U.S. Pat. No. 7,006,168, the disclosure of which is herein incorporated by reference in its entirety.

BACKGROUND OF THE INVENTION

1. Field of the Invention

The present invention relates to an FPD (Flat Panel Display) apparatus, and more particularly to an FPD apparatus having fixing members to secure a display module in a case of the FPD apparatus.

2. Description of the Related Art

Information processing devices have been developed to include various shapes and functions with a high data processing speed. In such information processing devices, processed information in the form of electric signals requires a display device as an interface means between a information processing device and a user.

Generally, a flat panel display apparatus is lighter and smaller than a CRT-type display apparatus and has a low power consumption. An LCD (Liquid Crystal Display) apparatus is a flat panel display apparatus widely used for a monitor of a computer, a television receiver and another display device.

The LCD apparatus changes an arrangement of liquid crystal molecules into a specific arrangement by applying a voltage to the liquid crystal molecules. The LCD apparatus changes the optical properties, such as birefringence, optical linearity, dichroism and light scattering, of liquid crystal cells, which emit light in response to its arrangement. The variations in the optical properties are converted into variations in visual properties to display an image.

The size of LCD apparatuses has been increased to comply with demand of customers, so that the size of an LCD module and a case for receiving the LCD module is also increased. Thus, there have been developments in a layout of components constituting an LCD apparatus to maintain the LCD apparatus compact and light.

In the structure of an LCD apparatus, the size of a space between an LCD module and a case is an important factor in determining the entire size of the LCD apparatus. The LCD module, generally, is combined with the case using screws engaged into holes disposed on sidewalls of the LCD module and case.

However, when the LCD module is combined with the case using the screws, steps, such as a process for forming the holes and engaging the screws into the holes, for assembling the LCD apparatus may increase. Also, since the LCD module is combined with the case using the screws, the number of parts of the LCD apparatus increases, thereby deteriorating productivity and assembling efficiency of the LCD apparatus.

Further, the LCD apparatus requires a combination space appropriate to engage the screws into the holes in order to combine the LCD module with the case using the screws. As a result, the size of a non-effective display area of the LCD apparatus increases, which results in an increase in the total size of the LCD apparatus.

BRIEF SUMMARY OF THE INVENTION

The present invention provides an FPD apparatus having an increased productivity and assembling efficiency.

In one aspect of the invention, there is provided an FPD apparatus comprising: a display module for displaying an image; a case for receiving the display module; and a fixing member disposed between the display module and the case to combine the display module with the case.

In an embodiment of the FPD apparatus, the fixing member is coupled with the display module without using screws. Thus, productivity and assembling efficiency of the FPD apparatus increase.

BRIEF DESCRIPTION OF THE DRAWINGS

The above and other advantages of the present invention will become readily apparent by reference to the following detailed description when considered in conjunction with the accompanying drawings wherein.

DETAILED DESCRIPTION OF THE INVENTION

Figure 1:
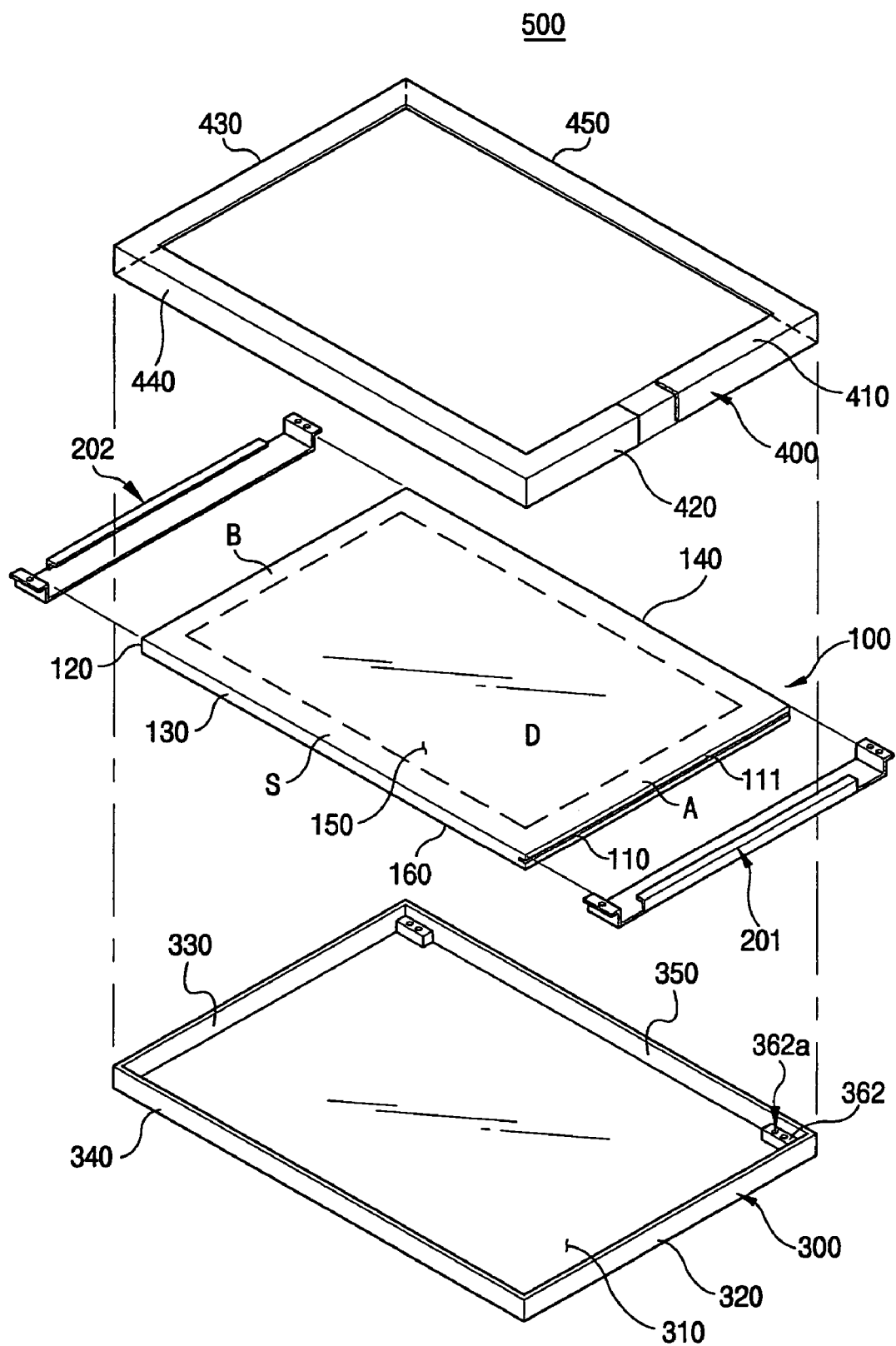
FIG. 1 is an exploded perspective view showing a structure of an FPD apparatus according to an embodiment of the present invention.
Figure 2:
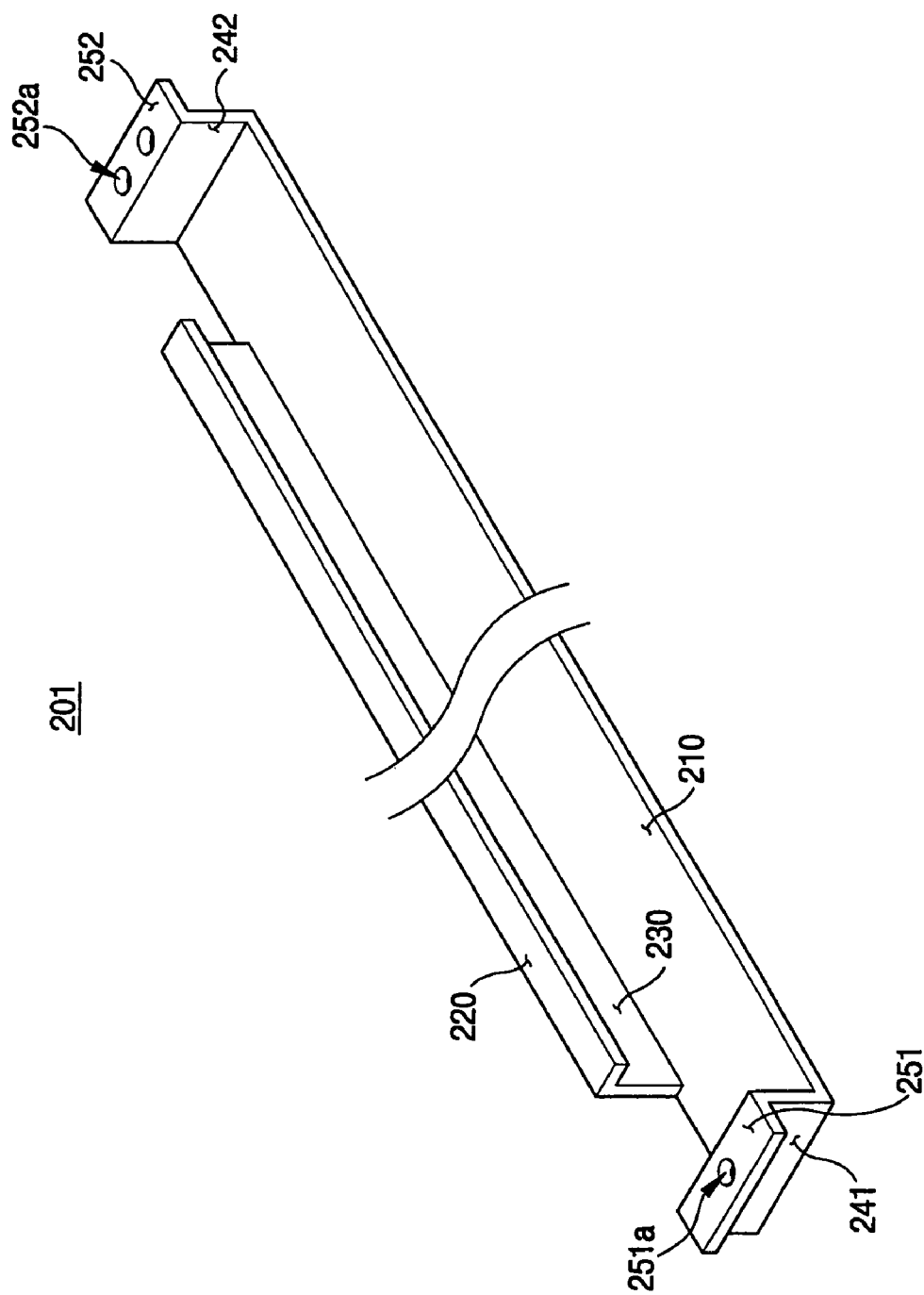
FIG. 2 is a perspective view showing a structure of a fixing member shown in FIG. 1.

FIG. 1 is an exploded perspective view showing a structure of an FPD apparatus according to an embodiment of the present invention, and FIG. 2 is a perspective view showing a structure of a fixing member shown in FIG. 1.

Referring to FIG. 1, an FPD apparatus 500 includes a display module 100 for displaying an image, cases 300 and 400 for covering the display module 100, a first fixing member 201 and a second fixing member 202 for fixing the display module 100 to the cases 300 and 400.

The display module 100 includes first, second, third and fourth side surfaces 110, 120, 130 and 140, a first surface 150 extended from the first to fourth side surfaces 110, 120, 130 and 140 and a second surface 160 facing to the first surface 150. The first surface 150 includes an effective display area D for displaying images and a non-effective display area S surrounding the display area D. The first and second side surfaces 110 and 120 facing each other are respectively provided with a fixing groove 111.

The cases 300 and 400 are, for example, a rear case 300 for covering a rear surface of the display module 100 and a front case 400 for covering a front surface of the display module 100, which is combined with the rear case 300.

The rear case 300 includes a bottom surface 310 and four first sidewalls 320, 330, 340 and 350 facing the first to fourth side surfaces 110, 120, 130 and 140, respectively. The first sidewalls 320, 330, 340 and 350 are extended from the bottom surface 310. Thus, the rear case 300 covers the display module 100 using the bottom surface 310 and the first sidewalls 320, 330, 340 and 350.

The front case 400 includes a upper surface 410 for covering the non-effective display area S of the first surface 150 of the display module 100 and four second sidewalls 420, 430, 440 and 450 facing the four first sidewalls 320, 330, 340 and 350, respectively. The second sidewalls 420, 430, 440 and 450 are extended from the upper surface 410. The front case 400 is combined with the rear case 300 after the display module 100 is covered by the rear case 300 so as to cover the non-effective display area of the first surface 150.

The first and second fixing members 201 and 202 are disposed at the end portions A and B of the display module 100, respectively, and combined with the display module 100. The first and second fixing members 201 and 202 combined with the display module 100 are coupled to the rear case 300 to prevent the display module 100 from being moved in the rear and front cases 300 and 400. Particularly, the first fixing member 201 is disposed at the first end portion A corresponding to the first side surface 110 of the display module 100 and the second fixing member 202 is disposed at the second end portion B corresponding to the second side surface 120 of the display module 100.

Hereinafter, since the first and second fixing members 201 and 202 have the same structure and function, only the first fixing member 201 will be described and a detailed description of the second fixing member 202 will be omitted.

As shown in FIG. 2, the first fixing member 201 includes a body portion 210, a first guiding portion 220, a connecting portion 230, a second guiding portion and a fixing portion.

The body portion 210 has a flat plate shape and faces to the second surface 160 of the display module 100. The first guiding portion 220 faces to the body portion 210 and guides the display module 100 along the body portion 210. That is, the first guiding portion 220 is extended in the longitudinal direction of the body portion 210, and its horizontal surfaces are parallel with those of the body portion 210. When the first fixing member 201 is combined with the display module 100, the first guiding portion 220 is inserted into the fixing groove 111 disposed on the first side surface 110 of the display module 100. The connecting portion 230 connects the body portion 210 and the first guiding portion 220.

The second guiding portion includes a first supporting portion 241 and a second supporting portion 242 extended from both end portions of the body portion 210. The first supporting portion 241 is corresponding to the third side surface 130 adjacent to the first side surface 110 and the second supporting portion 242 is corresponding to the fourth side surface 140 adjacent to the second side surface 120. Thus, the first and second supporting portions 241 and 242 prevent the display module 100 from being moved.

The fixing portion includes a first fixing portion 251 extended from the first supporting portion 241 and a second fixing portion 252 extended from the second supporting portion 242. The first and second fixing portions 251 and 252 are provided with a first engaging hole 251a and a second engaging hole 252a, respectively. As shown in FIG. 1, the rear case 300 is provided with a first protruding portion (not shown) and a second protruding portion 362 having a first engaging recess (not shown) and a second engaging recess 362a, respectively.

Although not shown in FIGS. 1 and 2, when the first fixing member 201 combined with the display module 100 is received in the rear case 300, the first fixing member 201 is coupled to the rear case 300 using screws (referring to FIG. 4) that are passing through the first and second fixing portions 251 and 252.

Figure 3:
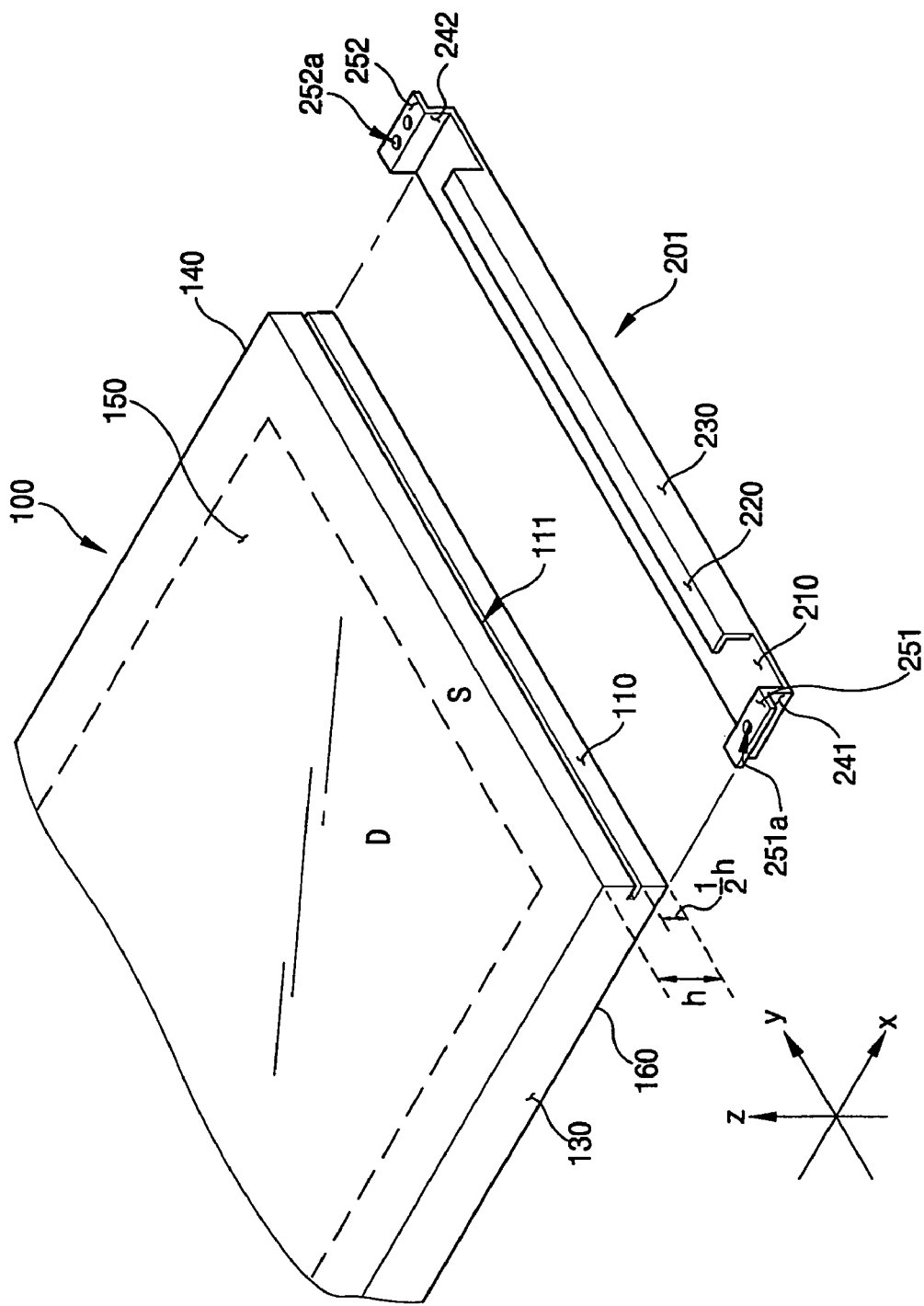
FIGS. 3 and 4 are perspective views showing an assembled structure of the display module and the first fixing member shown in FIG. 1.
Figure 4:
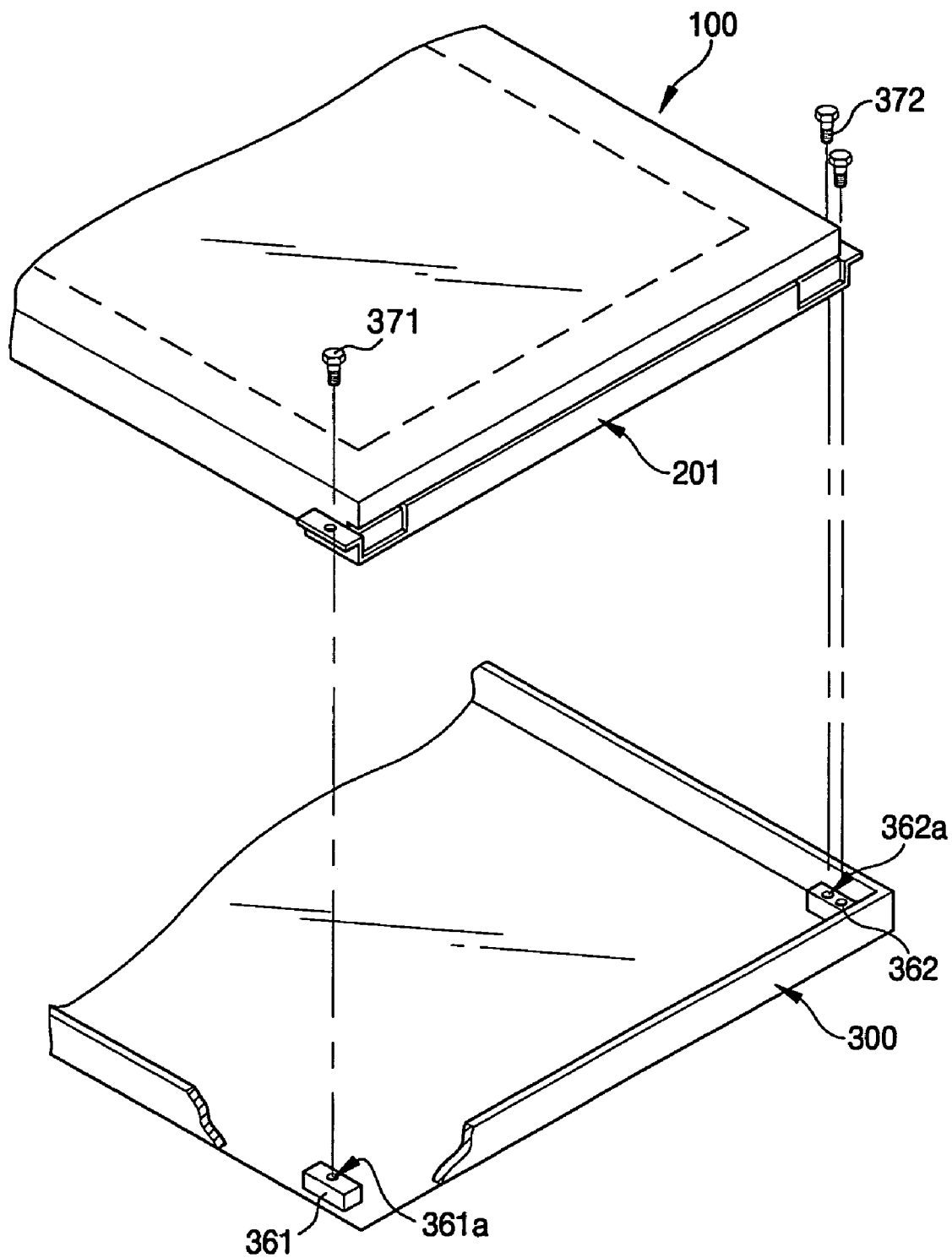

FIGS. 3 and 4 are perspective views showing an assembled structure of the display module and the first fixing member shown in FIG. 1.

Referring to FIGS. 3 and 4, the display module 100 includes the first surface 150, the second surface 160 facing the first surface 150 and the first side surface 110 that connects the first surface 150 and the second surface 160. The first side surface 110 is provided with the fixing groove 111 and the fixing groove 111 is disposed along the widthwise center of the first side surface 110. That is, assuming that the first side surface 110 has height "h", the fixing groove 111 is positioned at a height of about "h/2".

The first fixing member 201 includes the body portion 210 facing to the second surface 160, the first guiding portion 220 parallel to the body portion 210 and inserted into the fixing groove 111 so as to guide the display module 100 along the body portion 210 and the connecting portion 230 facing to the first side surface 110 and connecting the body portion 210 and the first guiding portion 220. Thus, the first fixing member 201 prevents the display module 100 from being moved in direction "Z".

Also, the first fixing member 201 further includes the second guiding portion having the first and second supporting portions 241 and 242 extended from the end portions of the body portion 210, respectively. Each of the first and second supporting portions 241 and 242 is extended in direction Z. Assuming that the third and fourth side surfaces 130 and 140 each have height "h", the first and second supporting portions 241 and 242 each have a height of about "h/2". Accordingly, the first fixing member 201 prevents the display module 100 from being moved in direction "Y" using the first and second supporting portions 241 and 242.

The first fixing member 201 further includes the first and second fixing portions 251 and 252 extended from the first and second supporting portions 241 and 242, respectively. The first and second supporting portions 241 and 242 are provided with the first and second engaging holes 251a and 252a, respectively. The rear case 300 further includes the first and second protruding portions 361 and 362 corresponding to the first and second fixing portions 251 and 252, respectively. The first and second protruding portions 361 and 362 are provided with the first and second engaging recesses 361a and 362a corresponding to the first and second engaging holes 251a and 252a, respectively.

Accordingly, when the first fixing member 201 is received into the rear case 300, the first and second engaging holes 251a and 252a are corresponding to the first and second engaging recesses 361a and 362a, respectively. A first screw 371 is sequentially engaged into the first engaging hole 251a and the first engaging recess 361a and a second screw 372 is sequentially engaged into the second engaging hole 252a and the second engaging recess 362a so as to combine the first fixing member 201 with the rear case 300.

The second fixing portion 252 is for combining the first fixing member 201 with the rear case 300 and the first fixing portion 251 is for combining the rear case 300 with the front case 400 using a hinge member (not shown).

Accordingly, in an assembled FPD apparatus, the display module 100 received into the rear case 300 is prevented from being moved in directions Z and Y. Since the first and second fixing members 201 and 202 are disposed at the first and second end portions "A" and "B" of the display module 100 (referring to FIG. 1), the display module 100 is also prevented from being moved in direction X.

Particularly, since the first fixing member 201 may be combined with the display module 100 without screws, the number of parts used to combine the display module 100 with the rear case 300 may be reduced, so that productivity and assembling efficiency of the FPD apparatus 500 may increase.

Also, the first fixing member 201 has a strength capable of preventing the display module 100 from being damaged by an external impacts because the rear and front cases 300 and 400 are made of, for example, plastic material.

The rear and front cases 300 and 400 are combined with each other using a hook (not shown). That is, one of the rear and front cases 300 and 400 is provided with a protrusion and the other of the rear and front cases 300 and 400 is provided with a recess. The rear and front cases 300 and 400 may be combined with each other by engaging the protrusion into the recess.

Figure 5:
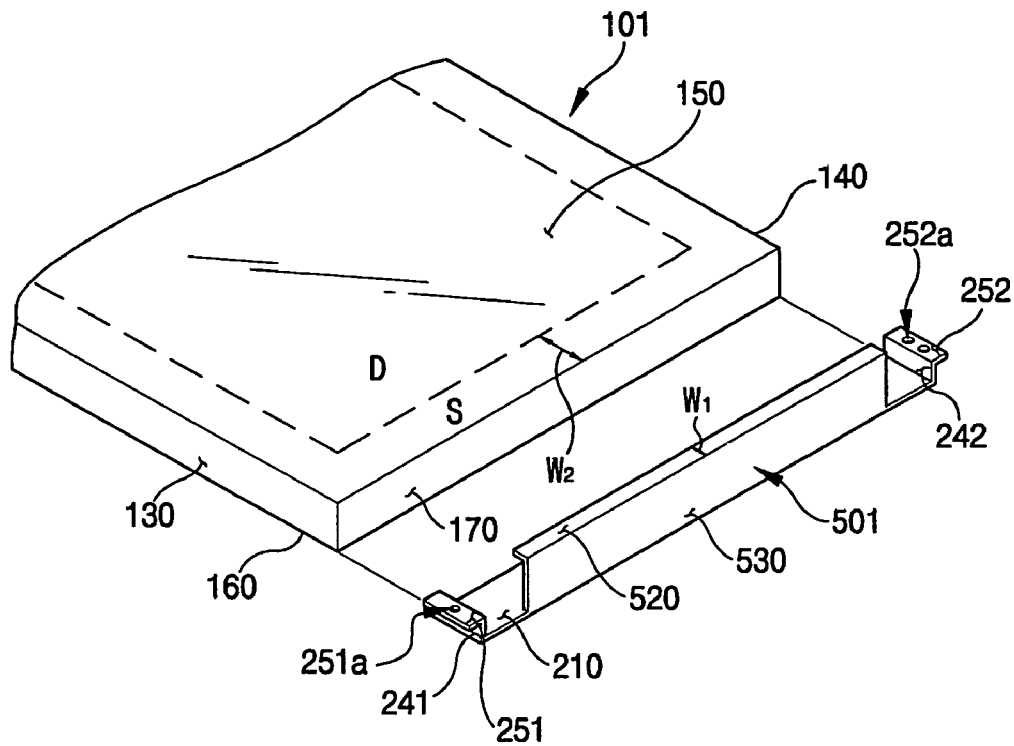
FIGS. 5 and 6 are perspective views of a display module and a fixing member according to another embodiment of the present invention.
Figure 6:
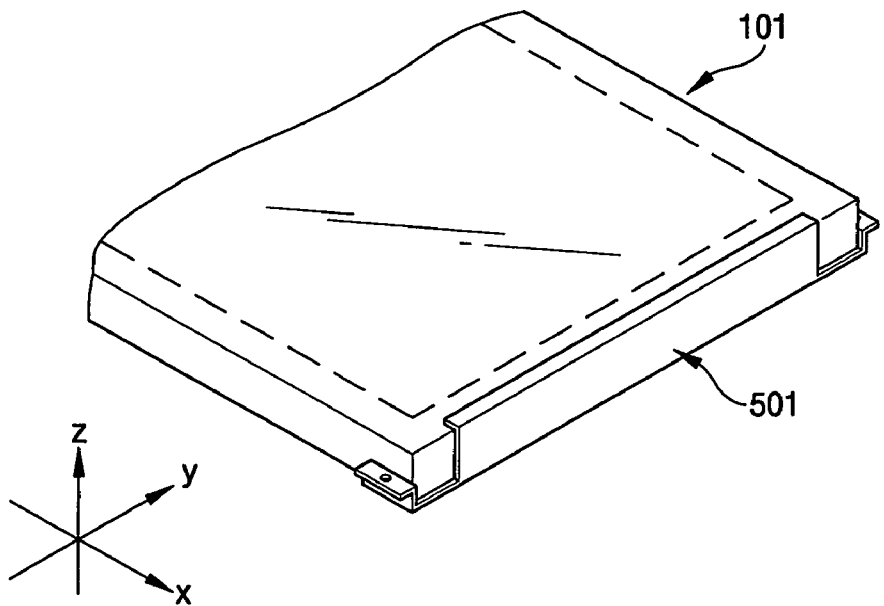

FIGS. 5 and 6 are perspective views of a display module and a fixing member according to another embodiment of the present invention. In FIGS. 5 and 6, the elements equivalent to those in FIGS. 3 and 4 are represented with like reference numerals.

Referring to FIGS. 5 and 6, a display module 101 includes a first surface 150 for displaying an image, a second surface 160 facing the first surface 150, and first to fourth side surfaces 170, 130 and 140. The first surface 150 includes an effective display area D for displaying images and a non-effective display area S surrounding the display area D at the margins of the first surface 150.

A fixing member 501 includes a body portion 210 facing to the second surface 160, a guiding portion 520 facing to the first surface 150 for guiding the display module 101 along the body portion 210, and a connecting portion 530 connecting the body portion 210 and the guiding portion 520. The connecting portion 530 faces to the first side surface 170. The guiding portion 520 is disposed corresponding to the non-effective display area S of the first surface 150. Particularly, the width W1 of the guiding portion 520 is narrower than the width W2 of the non-display area S. Thus, the guiding portion 520 does not reduce the display area D of the display module 101.

Figure 7:
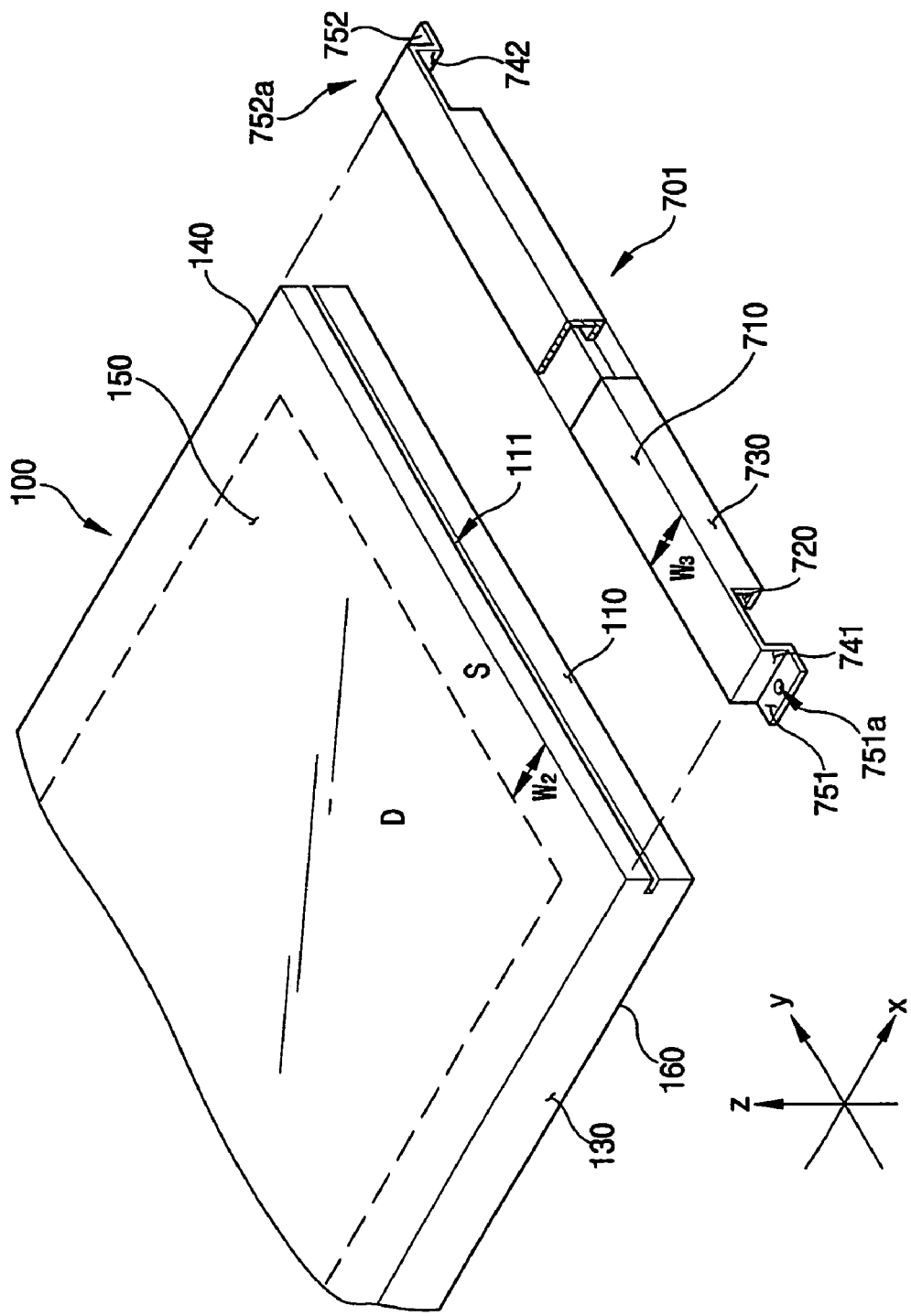
FIGS. 7 and 8 are perspective views of a display module and a fixing member according to another embodiment of the present invention.
Figure 8:
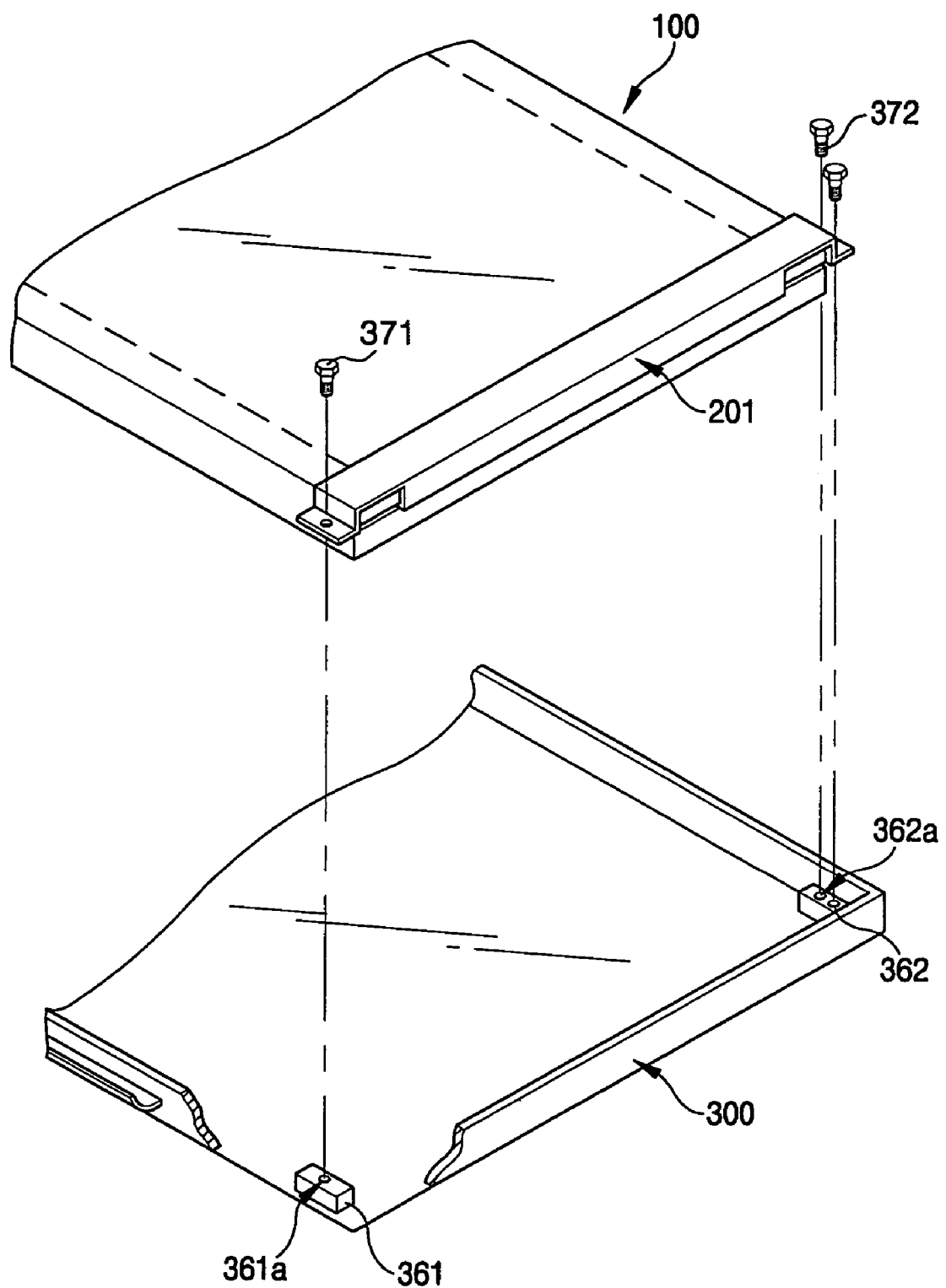

FIGS. 7 and 8 are perspective views showing a structure of a display module and a fixing member according to another embodiment of the present invention.

Referring to FIGS. 7 and 8, a display module 100 includes a first surface 150 for displaying an image, a second surface 160 facing the first surface 150, and first to fourth side surfaces 110, 130 and 140. The first surface 150 includes an effective display area D for displaying images and a non-effective display area S surrounding the display area D. The first side surface 110 is provided with a fixing groove 111 disposed along the widthwise center of the first side surface 110. That is, assuming that the first side surface 110 has height "h", the fixing groove 111 has a height of about "h/2".

A fixing member 701 includes a body portion 710 facing to the first surface 150, a guiding portion 720 to be inserted into the fixing groove 111 for guiding the display module 100 along the body portion 710, and a connecting portion 730 connecting the body portion 710 and the guiding portion 720. The connecting portion 730 faces to the first side surface 110. The width W3 of the body portion 710 is narrower than the width W2 of the non-display area S. Thus, the body portion 710 does not reduce the effective display area D of the display module 100.

The fixing member 701 further includes another guiding portion having the first and second supporting portions 741 and 742 extended from the end portions of the body portion 710, respectively. Each of the first and second supporting portions 741 and 742 is extended in direction Z. Assuming that the third and fourth side surfaces 130 and 140 each have height "h", the first and second supporting portions 741 and 742 each have a height of about "h/2". Accordingly, the fixing member 701 prevents the display module 100 from being moved in direction Y using the first and second supporting portions 741 and 742.

The fixing member 701 further includes a first fixing portion 751 and a second fixing portion 752 extended from the first and second supporting portions 741 and 742, respectively. The first and second fixing portions 751 and 752 are provided with first and second engaging holes 751a and 752a, respectively. The rear case 300 further includes first and second protruding portions 361 and 362 corresponding to the first and second fixing portions 751 and 752, respectively. The first and second protruding portions 361 and 362 are provided with first and second engaging recesses 361a and 362a corresponding to the first and second engaging holes 751a and 752a.

Accordingly, when the fixing member 701 is received into the rear case 300, the first and second engaging holes 751a and 752a are corresponding to the first and second engaging recesses 361a and 362a, respectively. A first screw 371 is sequentially engaged into the first engaging hole 751a and the first engaging recess 361a and a second screw 372 is sequentially engaged into the second engaging hole 752a and the second engaging recess 362a so as to combine the first fixing member 201 with the rear case 300.

Figure 9:
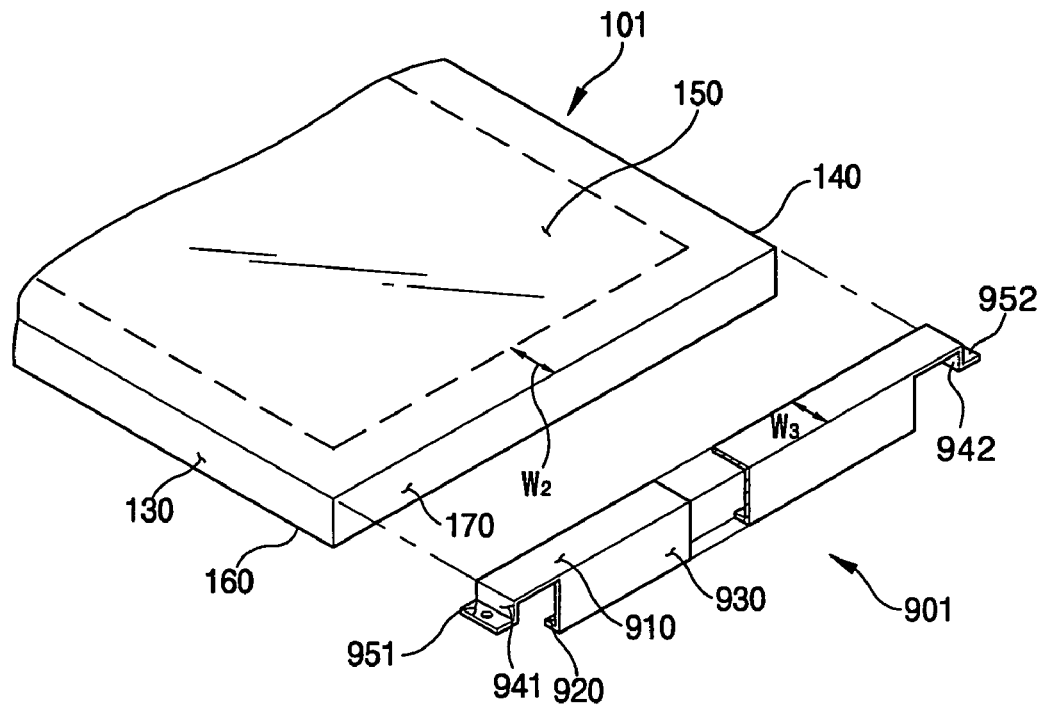
FIGS. 9 and 10 are perspective views of a display module and a fixing member according to another embodiment of the present invention.
Figure 10:
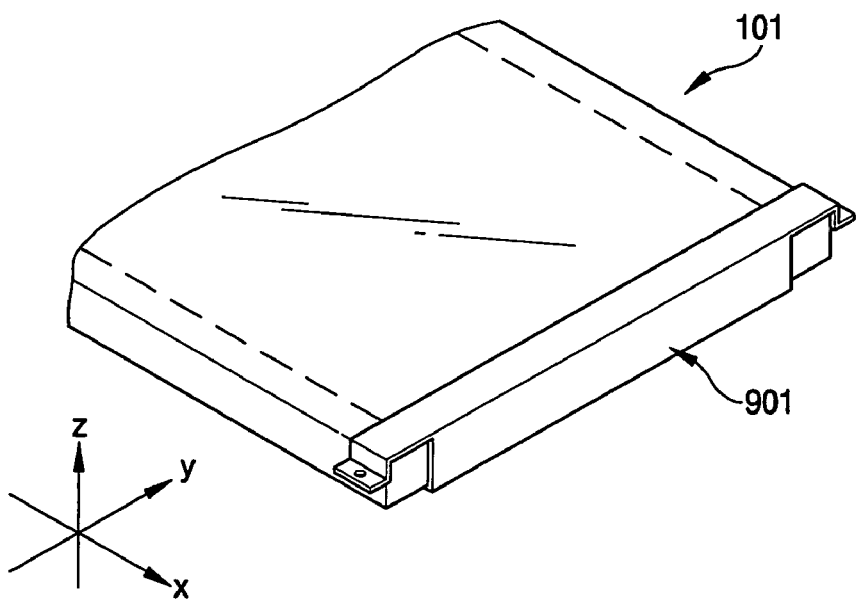

FIGS. 9 and 10 are perspective views of a display module and a fixing member according to another embodiment of the present invention.

Referring to FIGS. 9 and 10, a display module 101 includes a first surface 150 for displaying an image, a second surface 160 facing the first surface 150 and first to fourth side surfaces 170, 130 and 140. The first surface 150 includes an effective display area D for displaying images and a non-effective display area S surrounding the display area D.

A fixing member 901 includes a body portion 910 facing to the first surface 150, a guiding portion 920 facing to the second surface 160 for guiding the display module 101 along the body portion 910, and a connecting portion 930 for connecting the body portion 910 and the guiding portion 920. The connecting portion 930 faces to the first side surface 170. The width W3 of the body portion 910 is narrower than the width W2 of the non-display area S.

The fixing member 901 further includes another guiding portion having first and second supporting portions 941 and 942 extended from the end portions of the body portion 910, respectively. Also, the fixing member 901 further includes a first fixing portion 951 and a second fixing portion 952 extended from the first and second supporting portions 941 and 942, respectively.

Figure 11:
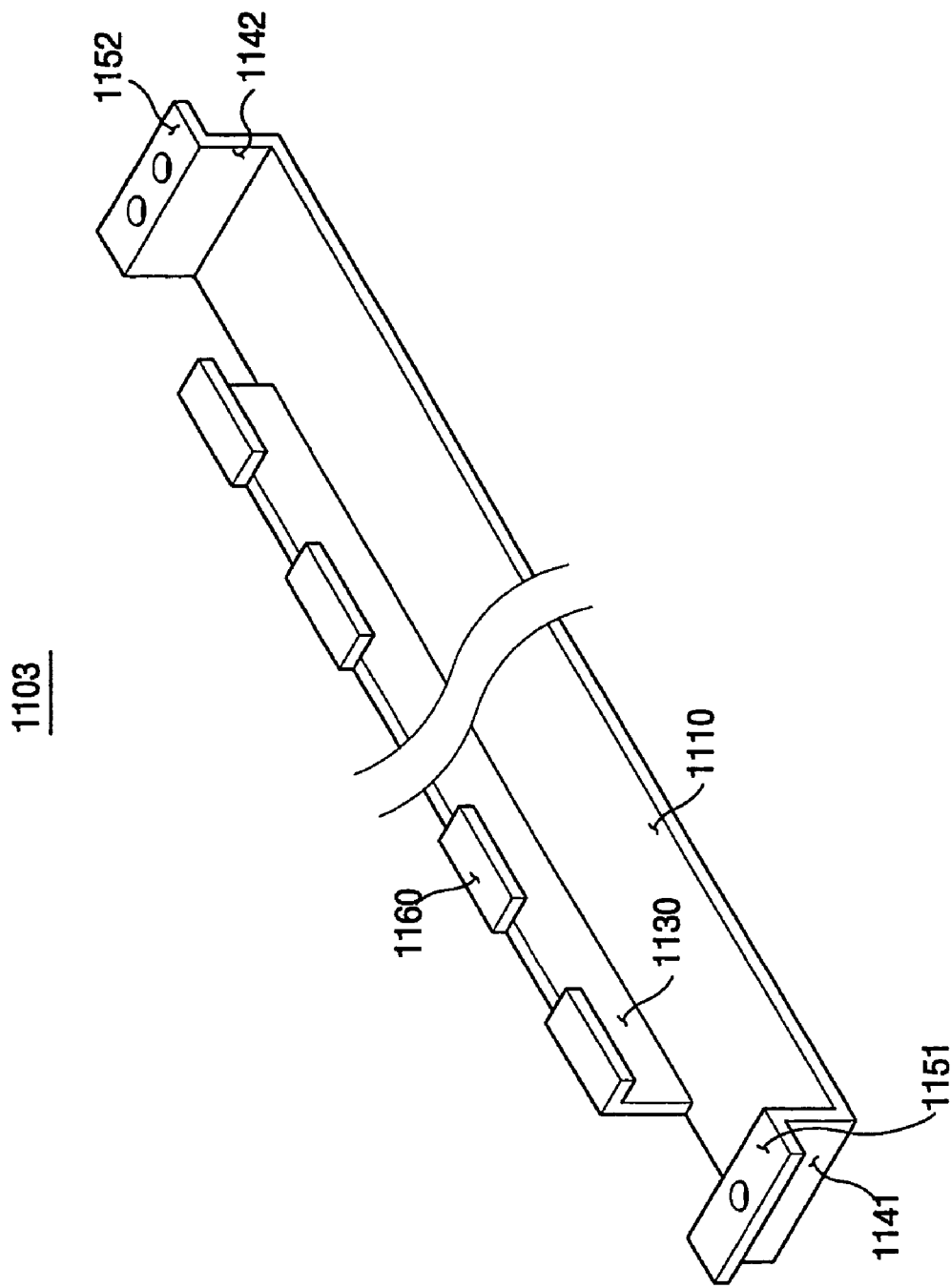
FIG. 11 is a perspective view showing a structure of a fixing member according to another embodiment of the present invention.

FIG. 11 is a perspective view showing a structure of a fixing member according to another embodiment of the present invention.

Referring to FIG. 11, a fixing member 1103 includes a body portion 1110, a plurality of guiding portions 1160 facing to the body portion 1110 and separated from each other, and a connecting portion 1130 that connects the guiding portions 1160 and the body portion 1110. Also, the fixing member 1103 further includes another guiding portion having first and second supporting portions 1141 and 1142 respectively extended from the end portions of the body portion 1110. The fixing member 1103 further includes first and second fixing portions 1151 and 1152 extended from the first and second supporting portions 1141 and 1142, respectively.

The fixing member 1103 has a weight less than that of the first fixing member 201 shown in FIG. 2 because the fixing member 1103 shown in FIG. 11 has the guiding portions 1160 discretely formed, where a space is provided between the adjacent guiding portions.

Figure 12:
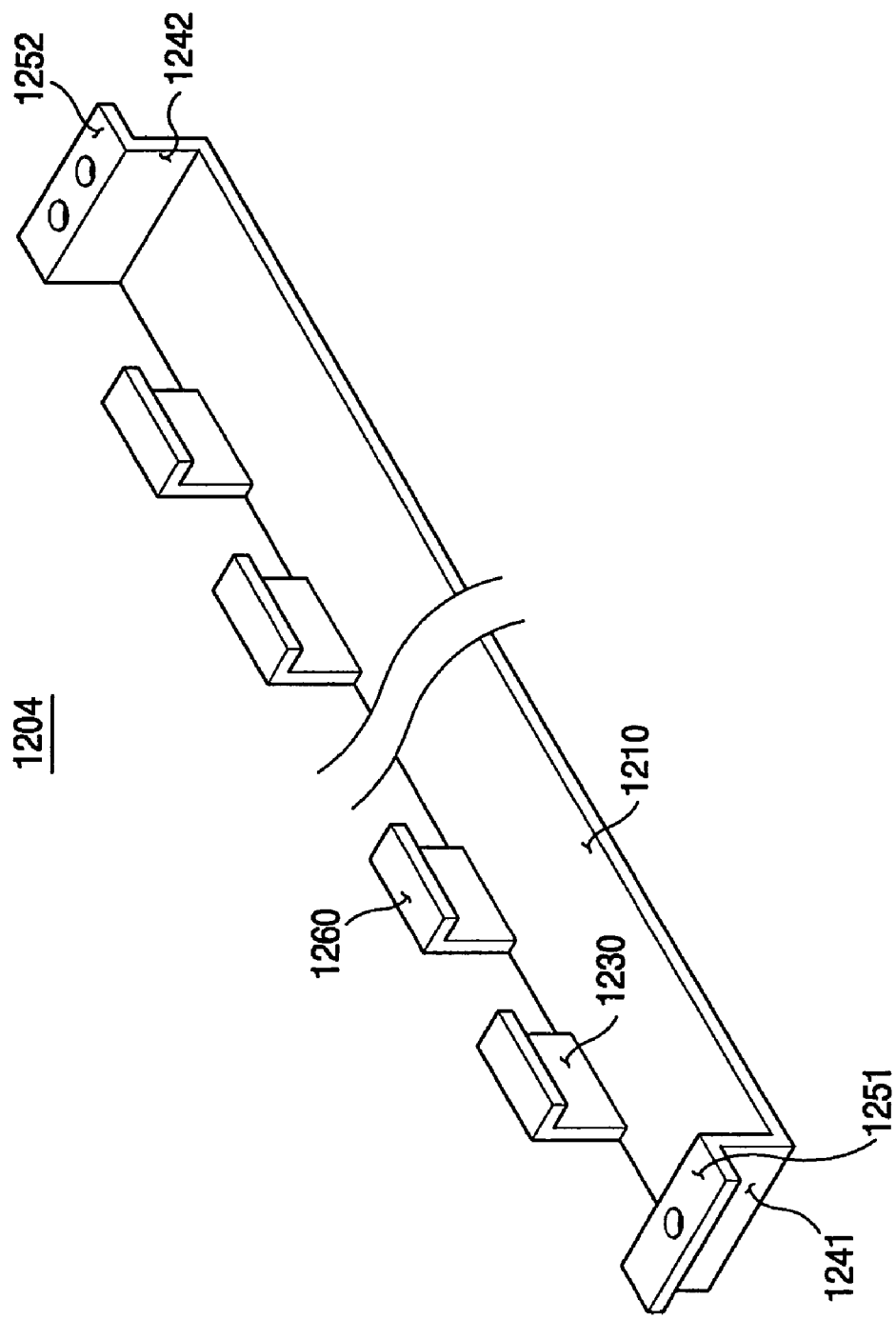
FIG. 12 is a perspective view showing a structure of a fixing member according to another embodiment of the present invention.

FIG. 12 is a perspective view showing a structure of a fixing member according to another embodiment of the present invention.

Referring to FIG. 12, a fixing member 1204 includes a body portion 1210, a plurality of guiding portions 1260 separated from each other and a plurality of connecting portion 1230 that connects the guiding portions 1260 and the body portion 1210. The connecting portions 1230 are separated from each other in a predetermined distance, same as the guiding portions 1260 do. In this embodiment, each of the connecting portions 1230 is integrally connected with corresponding one of the guiding portions 1260. Thus, the fixing member 1204 has a weight less than that of the first fixing member 1103 shown in FIG. 11 because the connecting portions 1230 as well as the guiding portions 1260 are discretely formed such that a space is provided between the adjacent connecting portions. In the exemplary embodiments above described referring to FIGS. 5 through 12, the description is directed to the fixing members to be assembled at the first side surface of the display module. It should be noted that another fixing member equivalent to any of the exemplary embodiments may also be assembled at the second side surface of the display module.

Figure 13:
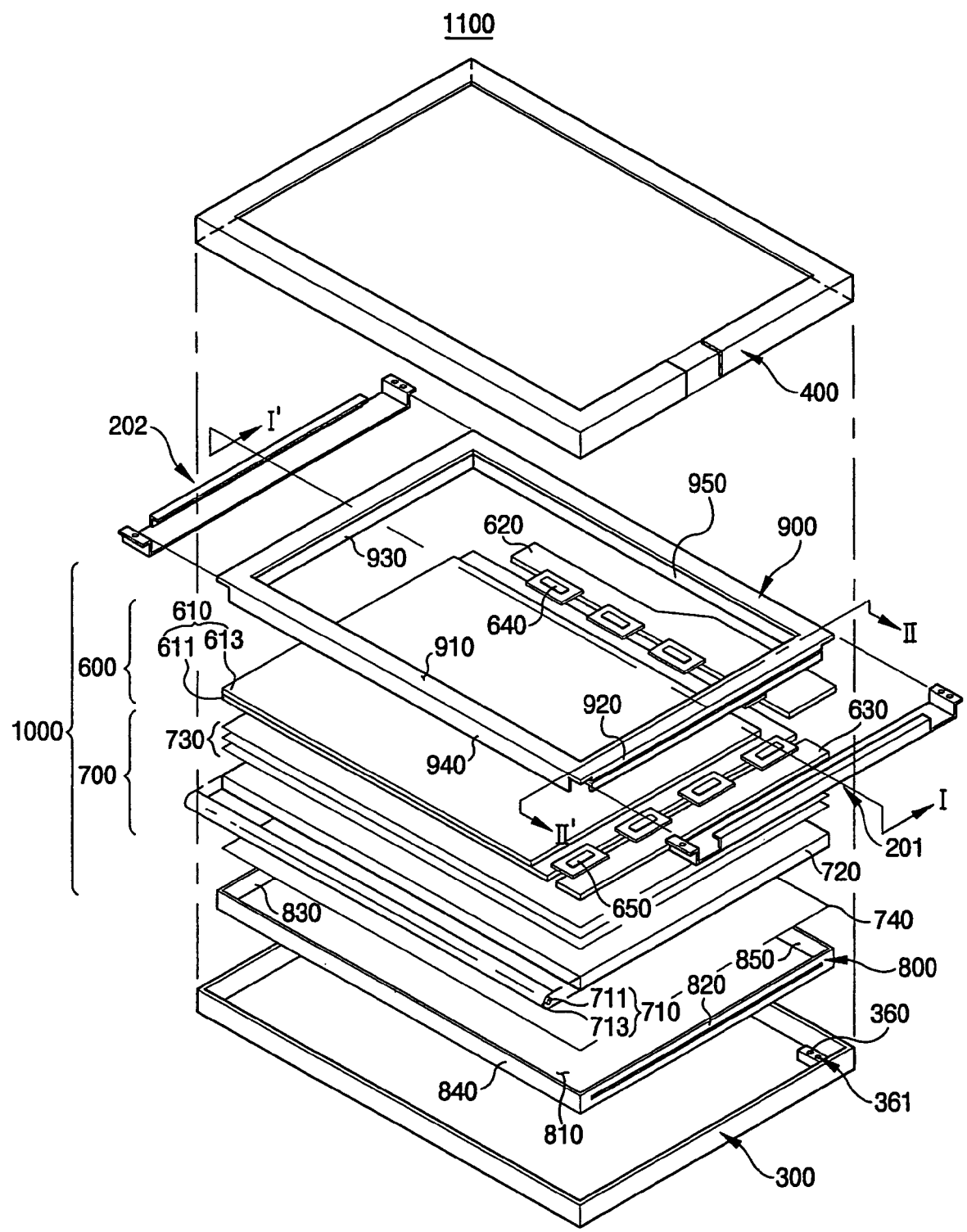
FIG. 13 is an exploded perspective view showing a structure of an LCD apparatus according to an embodiment of the present invention.
Figure 14:
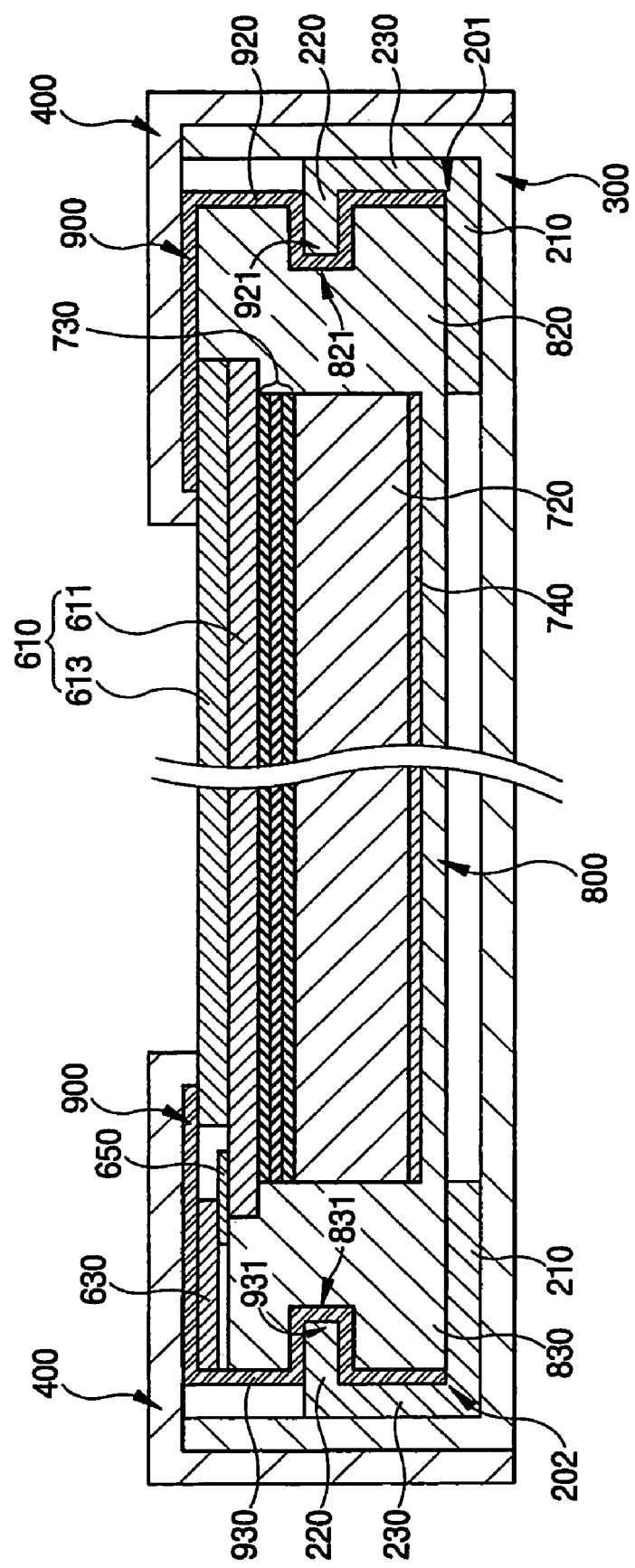
FIG. 14 is a sectional view, taken along the lines I-I', of the LCD apparatus shown in FIG. 13.
Figure 15:
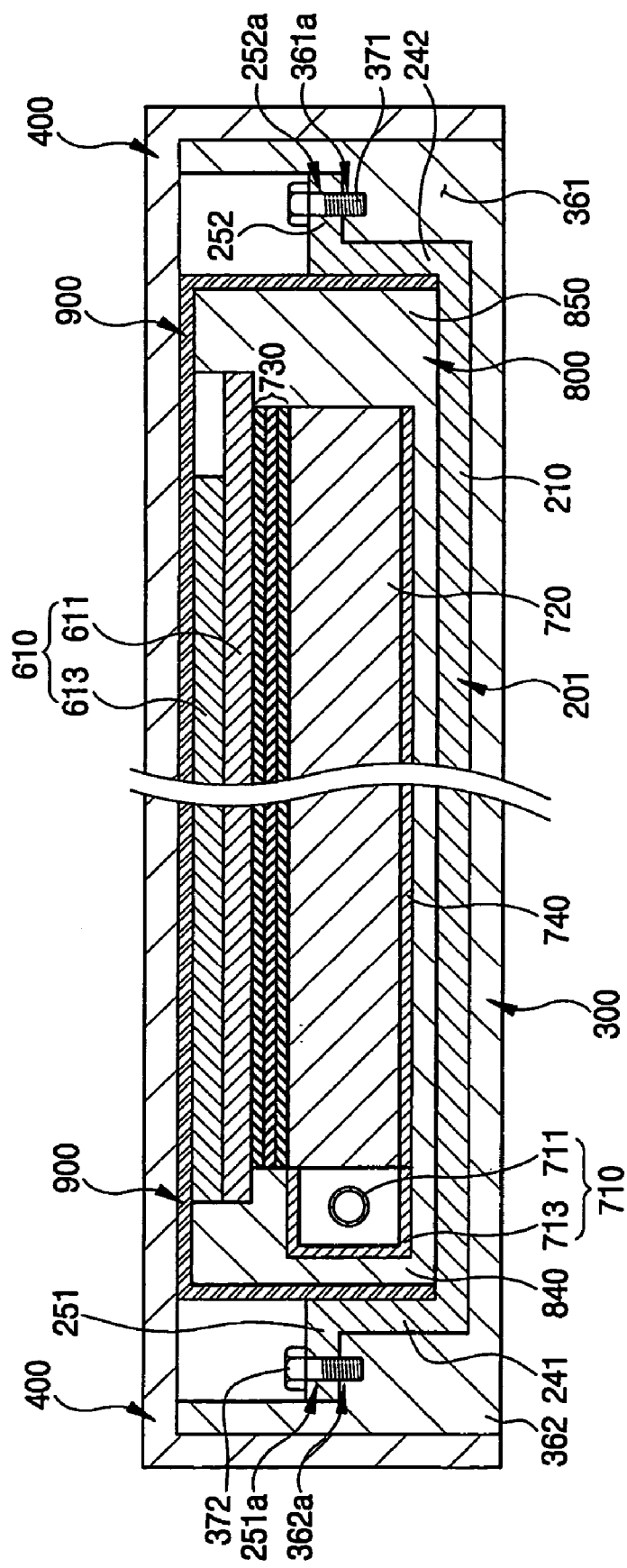
FIG. 15 is a sectional view, taken along the lines II-II', of the LCD apparatus shown in FIG. 13.

FIG. 13 is an exploded perspective view showing a structure of an LCD apparatus (as an example of an FPD apparatus) according to an embodiment of the present invention. FIG. 14 is a sectional view, taken along the lines I-I', of the LCD apparatus shown in FIG. 13. FIG. 15 is a sectional view, taken along the lines II-II', of the LCD apparatus shown in FIG. 13.

Referring to FIGS. 13 to 15, an LCD apparatus 1100 includes an LCD module 1000 for displaying an image, a rear case 300 and a front case 400 to be combined with the rear case 300 for receiving the LCD module 1000 and first and second fixing members 201 and 202 so as to prevent the LCD module 1000 from being moved in the rear and front cases 300 and 400.

The LCD module 1000 includes a display unit 600 for displaying images by controlling light transmittance using liquid crystal therein, a backlight unit 700 for supplying light to the display unit 600, a first receiving container 800 for receiving the display and backlight units 600 and 700, and a second receiving container 900 to be combined with the first receiving container 800 to secure the display unit 600 in the first receiving container 800.

The display unit 600 includes an LCD panel 610 for displaying images, and data and gate PCBs (Printed Circuit Board) 620 and 630 for generating driving signals applied to the LCD panel 610.

The LCD panel 610 includes a TFT (Thin Film Transistor) substrate 611, a color filter substrate 613, and liquid crystal (not shown) interposed between the TFT and color filter substrates 611 and 613. The TFT substrate 611 includes a plurality of gate lines (not shown) extended in a column direction, a plurality of data lines (not shown) extended in a row direction, TFTs (not shown) each connected to the gate and data lines, and a pixel electrode (not shown) connected to the respective TFTs.

The LCD panel 610 is provided with a gate TCP (Tape Carrier Package) 650, which is a kind of flexible films, so as to electrically connect the LCD panel 610 to the gate PCB 630. The gate TCP 650 is disposed on a gate portion, on which terminals of the gate lines are disposed, of the LCD panel 610. Also, the LCD panel 610 is provided with a data TCP 640 so as to electrically connect the LCD panel 610 to the data PCB 620. The data TCP 640 is disposed on a data portion, on which terminals of the data lines are disposed, of the LCD panel 610.

The backlight unit 700 includes a light source part 710 for generating first light, a light guide plate 720 for guiding the first light to the LCD panel 610, and a plurality of optical sheets 730 for increasing brightness properties of the first light emitted from the light guide plate 720.

The light source part 710 includes a lamp 711 for generating the first light and a lamp reflector 713 for partially covering the lamp 711 to reflect the first light from the lamp 711 to the light guide plate 720. The light guide plate 720 has a rectangular parallelepiped shape, receives the first light through one or more side surfaces thereof and emits a second light through a front surface. A reflecting plate 740 is disposed under the light guide plate 720 to reflect a third light leaked from the light guide plate 720, and the optical sheets 730 are disposed on the light guide plate 720 to diffuse or condense the second light emitted from the light guide plate 720.

The first receiving container 800 includes a bottom surface 810 and first to fourth sidewalls 820, 830, 840 and 850 extended from the bottom surface 810 to provide a receiving space. The light source part 710, light guide plate 720, optical sheets 730 and reflecting plate 740 of the backlight assembly 700 are received into the receiving space of the first receiving container 800.

That is, when the light source part 710 is received into the receiving space adjacent to the third sidewall 840 of the first receiving container 800, the reflecting plate 740, light guide plate 720 and optical sheets 730 are sequentially received onto the bottom surface 810 of the first receiving container 800. The display unit 600 is disposed on the plurality of optical sheets 730.

The LCD panel 610 is disposed on the first to fourth sidewalls 820, 830, 840 and 850 of the first receiving container 800 and the gate PCB 630 is received in a PCB receiving portion (not shown) extended from the first sidewall 820 of the first receiving container 800. Also, the data PCB 620 is positioned at a rear surface of the first receiving container 800 by outwardly bending the data TCP 640 along an outer surface of the first receiving container 800.

The second receiving container 900 includes a upper surface 910 and fifth to eighth sidewalls 920, 930, 940 and 950 extended from the upper surface 910. The second receiving container 900 is combined with the first receiving container 900 receiving the backlight and display units 600 and 700. Accordingly, the upper surface 910 is faced to the non-effective display area S of the display unit 600 and the fifth to eighth sidewalls 920, 930, 940 and 950 are faced to the first to fourth sidewalls 820, 830, 840 and 850 of the first receiving container 800. Although not shown in FIG. 13, the first receiving container 800 is combined with the second receiving container 900 using hooks or screws, thereby preventing the backlight and display units 700 and 600 from being deviated from the first receiving container 800.

As shown in FIGS. 13 and 14, the fifth and sixth sidewalls 920 and 930 of the second receiving container 900 are provided with first and second fixing grooves 921 and 931, respectively. The first and second fixing grooves 921 and 931 are positioned at a center of the fifth and sixth sidewalls 920 and 930. That is, assuming that the fifth and sixth sidewalls 920 and 930 have a height of "h", the first and second fixing grooves 921 and 931 are positioned at a height of about "h/2".

The first and second sidewalls 820 and 830 of the first receiving container 800 facing to the fifth and sixth sidewalls 920 and 930 of the second receiving container 900 are provided with first and second combining grooves 821 and 831 corresponding to the first and second fixing grooves 921 and 931. The first and second combining grooves 821 and 831 compensate for an increase in the thickness of the fifth and sixth sidewalls 920 and 930, that increases by forming the first and second fixing grooves 921 and 931 on the fifth and sixth sidewalls 920 and 930.

Therefore, the fifth and sixth sidewalls 920 and 930 are combined with the first and second sidewalls 820 and 830 to couple the first and second fixing grooves 921 and 931 to the first and second combining grooves 821 and 831, thereby preventing an increase in the size of the LCD apparatus 1100.

Although not shown in FIGS. 13 and 14, the first and second fixing grooves 921 and 931 may have a hole shape by perforating the fifth and sixth sidewalls 920 and 930 of the second receiving container 900.

The first and second fixing members 201 and 202 are inserted into the first and second grooves 921 and 931 disposed on the fifth and sixth sidewalls 920 and 930 of the second receiving container 900 to prevent the LCD module 1000 from being moved.

Since the first and second fixing members 201 and 202 have the same structure, only the first fixing member 201 will be described.

The first fixing member 201 includes a body portion 210 facing the bottom surface 810 of the first receiving container 800, a first guiding portion 220 inserted into the first fixing groove 921 of the second receiving container 900 for guiding the LCD module 1000 along the body portion 210, and the connecting portion 230 for connecting the body portion 210 with the first guiding portion 220. Thus, the first fixing member 201 prevents the LCD module 1000 from being moved vertically.

Referring to FIG. 15, the first fixing member 201 further includes a second guiding portion having first and second supporting portions 241 and 242 extended from the end portions of the body portion 210, respectively. The first and second supporting portions 241 and 242 are faced with the seventh sidewall 940 and the eighth sidewall 950, respectively, of the second receiving container 900.

Accordingly, the first fixing member 201 supports the seventh and eighth sidewalls 940 and 950 of the LCD module 1000 using the first and second supporting portions 241 and 242 to prevent the LCD module 1000 from being moved.

The first and second supporting portions 241 and 242 are extended from the end portions of the body portion 210 to the upper surface 910 of the second receiving container 900. The first and second supporting portions 241 and 242 have a height of about ½ of the height of the seventh and eighth sidewalls 940 and 950, respectively.

The first fixing member 201 further includes first and second fixing portions 251 and 252 extended from the first and second supporting portions 241 and 242. The first and second fixing portions 251 and 252 are provided with first and second engaging holes 251a and 252a. The rear case 300 further includes first and second protruding portions 361 and 362 corresponding to the first and second fixing portions 251 and 252. The first and second protruding portions 361 and 362 are provided with first and second engaging recesses 361a and 362a corresponding to the first and second engaging holes 251a and 252a, respectively.

Accordingly, when the first fixing member 201 combined with the LCD module 1000 is received into the rear case 300, the first and second engaging holes 251a and 252a are corresponding to the first and second engaging recesses 361a and 362a, respectively. A first screw 371 is sequentially engaged into the first engaging hole 251a and the first engaging recess 361a and a second screw 372 is sequentially engaged into the second engaging hole 252a and the second engaging recess 362a so as to combine the first fixing member 201 with the rear case 300.

According to the combination structure, the LCD module 1000 received into the rear case 300 is prevented from being moved in directions Z and Y. Also, since the first and second fixing members 201 and 202 are disposed at both end portions of the LCD module 1000, the display module 100 is also prevented from being moved in direction X.

Figure 16:
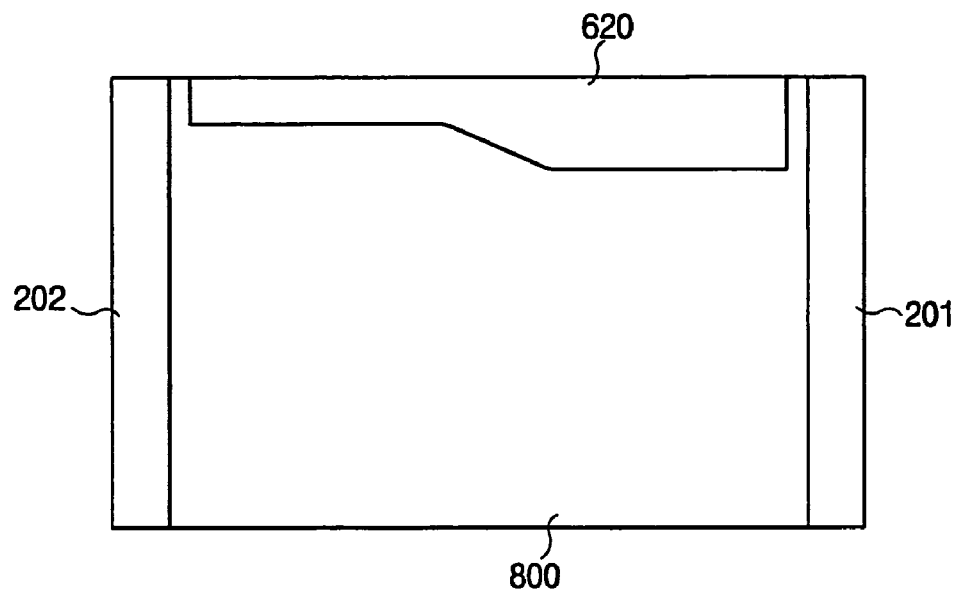
FIGS. 16 and 17 are schematic views showing positions of the data PCB and first and second fixing members shown in FIG. 13.
Figure 17:
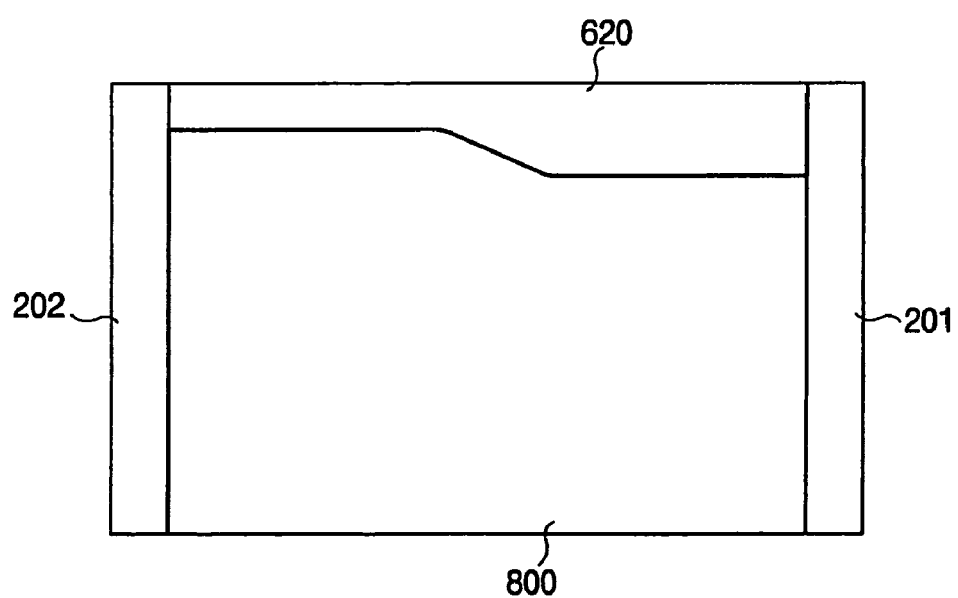

FIGS. 16 and 17 are schematic views showing positions of the data PCB and first and second fixing members shown in FIG. 13.

Referring to FIGS. 16 and 17, the data PCB 620 is disposed on the rear surface of the first receiving container 800 by outwardly bending the data TCP 640 along a margin of the first receiving container 800. The data PCB 620 is disposed on the rear surface of the first receiving container 800, so that the data PCB 620 may be overlapped with the first and second fixing members 201 and 202 when viewing the LCD module 1000 at a side of the first and second fixing members 201 and 202. In this embodiment, the data PCB 620 is separated from the first and second fixing members 201 and 202 in a predetermined distance as shown in FIG. 16, or the end portions of the data PCB 620 are in contact with the first and second fixing members 201 and 202 as shown in FIG. 17 so as to prevent a thickness of the LCD apparatus 1100 from being increased due to the overlap of the data PCB 620 and the fixing members.

In this embodiment, the data PCB 620 may have a length shorter than that of a conventional data PCB. In this case, the data PCB 620 has a width wider than that of a conventional data PCB to maintain a total size of the data PCB.

The aforementioned embodiments according to the present invention are applied not only to the LCD apparatus using the liquid crystal, but also to an FPD using an organic electroluminescence device and an FPD using plasma.

In an FPD apparatus according to the present invention, the fixing members are coupled to the case after combining with the display module, so that the fixing members prevent the display module in the case from being moved.

Also, there is no necessity of steps of forming screw holes on the display module and the case and engaging screws into the holes to combine the display module with the case.

Also, since the number of parts for combining the display module with the case is reduced, productivity of the FPD apparatus may increase.

Further, the thickness of the FPD apparatus may be reduced because the FPD apparatus does not need to have a separate space for the screws.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A flat panel display apparatus comprising:
a display module for displaying images;
a case for receiving the display module; and
a fixing member disposed between the display module and the case to combine the display module with the case;
wherein the display module comprises:
a display unit for displaying images using liquid crystal that controls transmittance of light;
a first receiving container for receiving the display unit, the first receiving container having a bottom surface and sidewalls extended from the bottom surface to provide a receiving space to receive the display unit; and
a second receiving container for being combined with the first receiving container to fix the display unit to the first receiving container, the second receiving container having an upper surface, sidewalls extended from the upper surface, and a fixing groove formed at a surface, which faces the case, of a sidewall of the second receiving container, the fixing groove formed as a substantially straight line form;
wherein the fixing member includes a first portion thereof engaged in the fixing groove, at the surface which faces the case, a second portion extending along a lower surface of the first receiving container and facing the bottom surface of the first receiving container, and a third portion connecting the first and second portions.

2. The flat panel display apparatus of claim 1, wherein the first and second portions extend from opposite ends of the third portion in a same direction.

3. A flat panel display apparatus comprising:
a display module for displaying images;
a case for receiving the display module; and
a fixing member disposed between the display module and the case to combine the display module with the case;
wherein the display module comprises:
a display unit for displaying images using liquid crystal that controls transmittance of light;
a first receiving container for receiving the display unit, the first receiving container having a bottom surface and sidewalls extended from the bottom surface to provide a receiving space to receive the display unit; and
a second receiving container for being combined with the first receiving container to fix the display unit to the first receiving container, the second receiving container having an upper surface, sidewalls extended from the upper surface, and a fixing groove formed at a sidewall of the second receiving container, the fixing groove formed as a substantially straight line form;
wherein the fixing member includes first and second portions formed as substantially flat, so that the fixing groove receives the first portion of the fixing member in a substantially horizontal direction, and the second portion faces the bottom surface of the first receiving container.

4. A flat panel display apparatus comprising:
a display module for displaying images;
a case for receiving the display module; and
a fixing member disposed between the display module and the case to combine the display module with the case;
wherein the display module comprises:
a display unit for displaying images using liquid crystal that controls transmittance of light;
a first receiving container for receiving the display unit, the first receiving container having a bottom surface and sidewalls extended from the bottom surface to provide a receiving space to receive the display unit; and
a second receiving container for being combined with the first receiving container to fix the display unit to the first receiving container, the second receiving container having an upper surface, sidewalls extended from the upper surface, and a fixing groove formed at a sidewall of the second receiving container, the fixing groove formed as a substantially straight line form;
wherein the fixing member comprises:
a body portion disposed to be faced with the upper surface of the second receiving container;
a first guiding portion for being inserted into the fixing groove to guide the display module along the body portion;
a connecting portion for connecting the body portion and the first guiding portion;
a second guiding portion extended from each of end portions of the body portion to guide the display module; and
a fixing portion extended from the second guiding portion to secure the fixing member onto the case.

5. A flat panel display apparatus comprising:
a display module for displaying images;
a case for receiving the display module; and
a fixing member disposed between the display module and the case to combine the display module with the case;
wherein the display module comprises:
a display unit for displaying images using liquid crystal that controls transmittance of light;
a first receiving container for receiving the display unit, the first receiving container having a bottom surface and sidewalls extended from the bottom surface to provide a receiving space; and
a second receiving container for being combined with the first receiving container to fix the display unit to the first receiving container, the second receiving container having an upper surface and sidewalls extended from the upper surface;
wherein the fixing member is combined with each of first and second end portions facing each other of the display module; and
wherein further, the fixing member comprises:
a body portion disposed to be faced with the upper surface of the second receiving container;
a first guiding portion disposed to be faced with the bottom surface of the first receiving container;
a connecting portion for connecting the body portion and the first guiding portion;
a second guiding portion extended from each of end portions of the body portion to guide the display module; and
a fixing portion extended from the second guiding portion to secure the fixing member onto the case.

* * * * *